United States Patent Office 3,825,652
Patented July 23, 1974

3,825,652
PRODUCTION OF MANGANESE (II) SALT SOLUTIONS
Eberhard Preisler, Hurth-Knapsack, Kurt Grapentin, Cologne-Zollstock, Ernst Harmsen, Erftstadt-Lechenich, and Heinz Harnisch, Lovenich, Germany, assignors to Knapsack Aktiengesellschaft, Knapsack, near Cologne, Germany
No Drawing. Filed Nov. 23, 1971, Ser. No. 201,318
Claims priority, application Germany, Nov. 25, 1970,
P 20 57 939.9
Int. Cl. C01g 45/00, 45/10
U.S. Cl. 423—50    8 Claims

ABSTRACT OF THE DISCLOSURE

Production of manganese (II) salt solutions having minor proportions of heavy metal contaminants therein by introducing one or more commercial manganese (II) compounds or ores into a mineral acid solution, precipitating the heavy metals by means of a sulfide compound, and isolating the resulting precipitate. More particularly, the commercial manganese (II) compounds or ores are introduced into the mineral acid solution and, while omitting filtration, the heavy metal sulfides are precipitated at a pH-value of between 3.5 and 8.2 and the precipitated sulfides are isolated together with the vein ore of the commercial manganese (II) compounds or ores, in a single step operation.

---

The present invention relates to the production of manganese (II) salt solutions having minor proportions of heavy metal contaminants therein and comprises introducing one or more commercial manganese (II) compounds or ores into a mineral acid solution, precipitating the heavy metals by means of a sulfide compound, and isolating the resulting precipitate.

These solutions, which generally contain manganese (II) sulfate or manganese (II) chloride, are feed materials that find widespread uses in the electrolytic and chemical production of manganese dioxide.

Manganese dioxide is normally precipitated electrolytically from sulfuric acid solutions having manganese sulfate therein by subjecting the manganese sulfate to anodic oxidation. Manganese dioxide is thereby precipitated from the electrolyte with the formation of free sulfuric acid. The same solutions can be used for the chemical production of manganese dioxide.

A solution useful to this end can be made by dissolving manganese (II) oxide or manganese carbonate in sulfuric acid, or in a sulfuric acid-containing electrolyte showing a certain reduction of manganese ions, such as that which is obtained in the electrolytic production of manganese dioxide. If use is made of commercial manganese oxide or manganese carbonate in preparing the solution, it is only natural that the solution always contains a plurality of impurities which strongly contaminate the final product or affect the smooth course of the electrolysis.

The elements which should preferably not appear in manganese dioxide include copper, iron, cobalt, nickel, arsenic and antimony. It is generally accepted that operation is greatly impaired by the presence of copper in as low a concentration as 1 part per million or—in the event of supersaturation—by the presence of calcium in proportions distinctly excelling the saturation concentration of calcium sulfate. Needless to say therefore the ions are required to be separated from the solution.

Normally the ions are separated from solutions saturated with manganese (II) oxide. Following this, the solution is mixed with sulfuric acid, for example with electrolyte rich in sulfuric acid coming from the electrolytic cell, the sulfuric acid being added in the quantity necessary for electrolysis.

Two methods are customarily used to achieve this. One of these two methods comprises separating the contaminants by hydrolysis, i.e. by establishing a pH-value in the neutralized manganese sulfate solution at which manganese hydroxide commences precipitation. This is the case at a pH-value of about 8.2, at which all ions producing hydroxides, hydrated oxides or further difficultly soluble compounds, such as iron arsenate, are co-precipitated and then accessible to filtration. The pH-values all refer to solutions or suspensions cooled down to temperatures of 22° C. They may significantly differ, however, if use is made of higher temperatures.

The second method comprises effecting precipitation by means of a sulfide and this following dissolution of the ores and separation of vein ore. This method enables copper, cobalt, nickel and lead ions to be readily separated. Prior to or following sulfide precipitation, the iron (II) ions are oxidized, in most cases with the use of atmospheric oxygen, so as to produce iron (III) ions, and iron (III) hydroxide is precipitated. The hydrolytic separation of iron is effected either in a separate process step or together with the separation of vein ore.

The purification of the crude solutions by sulfide precipitation produces good results, but two or even three steps are required to be used therein, for filtration. Hydrolysis on the other hand enables the contaminants to be separated in a single step operation. This, however, at the price of a final solution of lesser purity and at the price of higher loss of manganes, which is caused by the partial precipitation of manganese hydroxide.

It is an object of the present invention to provide a process for the production of very pure manganese (II) salt solutions having minor proportions of heavy metal contaminants therein by the steps comprising introducing one or more commercial manganese (II) compounds or ores into mineral acid solutions, precipitating the heavy metals by means of a sulfide compound and isolating the resulting precipitate, and this with only minor loss of manganese by subjecting the solution to a single step filtration.

This object is substantially achieved by the process of the present invention which more particularly comprises introducing the commercial manganese (II) compounds or ores into a mineral acid solution and, while omitting filtration, precipitating heavy metal sulfides at a pH-value of between 3.5 and 8.2, preferably at a pH-value of between 6.5 and 7.5, and subsequently separating the precipitated sulfides together with the vein ore of the commercial manganese (II) compounds or ores, in a single step operation.

An advantageous embodiment of the present invention provides for the sulfide compound used for effecting the precipitation to be employed in a slight excess over the quantity theoretically needed, and for the heavy metal sulfides to be precipitated at a temperature of between 50 and 95° C.

The useful mineral acid solutions primarily include hydrochloric or sulfuric acid solutions. Sulfuric acid solutions, especially electrolyte solutions, such as those which are obtained in the electrolytic production of manganese dioxide, are particularly preferred.

Further suitable starting materials include, as a useful commercial manganese (II) compound or manganese ore, manganese oxide and manganese carbonate, and include, as useful sulfide compounds, hydrogen sulfide or a metal sulfide, such as barium sulfide, manganese sulfide or an alkali metal sulfide, capable of reacting with the metal ions to be removed.

The mineral acid solutions should preferably be neutralized so as to establish a pH-value of about 3.5 with the use of a manganese (II) compound producing an alkaline reaction, and the pH-value should subsequently be increased to a value lower than 8.2 by the addition of a compound capable of neutralizing free acid, this latter compound being added prior to the addition of the sulfide compound. In those cases in which the precipitating agent is a sulfide compound of alkaline reaction, a lower pH-value consistent with the alkalinity of the sulfide compound should be established in the solution, prior to the addition of the sulfide compound.

The compounds useful for neutralizing free acid preferably include ammonia, alkali metal and alkaline earth metal hydroxides or carbonates, for example sodium hydroxide or calcium carbonate.

Following precipitation of the heavy metal sulfides, the mixture should preferably be allowed to stand over a period of between 15 and 120 minutes, prior to filtration, and air may be passed through the mixture so as to cool it and mix it therewith.

The process of the present invention offers the following beneficial effects. In contrast with earlier methods, it is possible in the present process by sulfide precipitation to isolate undesirable contaminants together with iron and vein ore in a single step operation, which ensures reliable purification, and this with considerably less expenditure of operational costs. Losses normally caused by hydrolysis are substantially obviated provided that the iron (II) ions are precipitated as FeS, in which form they fail to be re-oxidized by air. The steps used in the present process have been found effectively to prevent re-oxidation.

If the precipitation is effected in the manner set forth above at temperatures higher than 50° C., then the resulting sludge consisting of vein ore and precipitated matter is as easy to filter as in the absence of sulfides.

The following Examples are intended further to illustrate the process of the present invention.

EXAMPLE 1

3 liters of a hydrochloric acid solution, which contained 50 grams of HCl per liter, were neutralized at a temperature of 60° C. so as to establish a pH-value of 6.5, by the addition of commercial manganese carbonate. Following this, a barium sulfide quantity equivalent to the contaminants was added and a pH-value of 7.1 was found to establish in the solution. The resulting suspension was allowed to stand with agitation for 1 hour so as to complete the reaction, and insoluble matter was filtered off. The resulting filtrate contained between 4 and 6 p.p.m. (p.p.m. stands for part per million) of cobalt and nickel, 1 p.p.m. of iron, less than 0.1 p.p.m. of copper and less than 1 p.p.m. of lead.

EXAMPLE 2

3 liters of an electrolyte, which was taken from a cell for the electrolytic production of manganese dioxide and which contained 36 grams/liter of Mn and 68 grams/liter of $H_2SO_4$, were mixed with 170–190 grams of MnO so as to establish a pH-value of 3.0. Following this, NaOH was added to the solution, which had a temperature of 80° C., so as to establish a pH-value of 6.0 therein. Precipitation of the heavy metal sulfides was effected by the addition of solid $Na_2S$, and a pH-value of 6.9 was found to establish. Following filtration, the solution was found to contain less than 1 p.p.m. of iron, 4 p.p.m. of cobalt, 3 p.p.m. of nickel, less than 0.1 p.p.m. of copper and less than 1 p.p.m. of lead.

EXAMPLE 3

1.8 cubic meters of an electrolyte having a temperature of 90° C. and a composition the same as that indicated for the electrolyte used in Example 2, were mixed with 120 kg. of commercial manganese oxide and a pH-value of 5.2 was found to establish therein. Following the addition of 5 kg. of commercial calcium carbonate, the solution had a pH-value of 6.5. The heavy metals were precipitated with the use of 2.5 kg. of solid sodium sulfide and a pH-value of 7.2 was found to establish in the solution. Air was passed over a period of 15 minutes through the solution so as to cool it and mix it therewith. Following this, the solution was filtered. It contained 0.4 p.p.m. of cobalt, 0.3 p.p.m. of nickel, 0.7 p.p.m. of iron, less than 0.1 p.p.m of copper, 0.4 p.p.m. of arsenic, 0.4 p.p.m. of antimony and less than 1 p.p.m. of lead.

We claim:

1. A process for making manganese (II) salt solutions containing more manganese (II) and less heavy metal contaminants than the starting materials used for making them, the starting materials being hydrochloric or sulfuric acid-containing manganese (II) salt solutions having relatively little manganese (II) therein, or hydrochloric or sulfuric acid solutions, wherein at least one commercial manganese (II) compound or ore is introduced into the said starting manganese (II) salt solution or acid, the resulting heavy metals are precipitated by means of a sulfide compound and the resulting precipitate is separated, which process consists of introducing the said commercial manganese (II) compound or ore into the said starting manganese (II) salt solution or acid solution so as to establish a pH-value of about 3.5 therein; omitting filtration and removal of iron impurities; adding ammonia or a hydroxide or carbonate of an alkali metal or alkaline earth metal thereto and thereby increasing the pH-value to at most 8.2; further adding at a temperature of between 50 and 95° C. a sulfide of hydrogen, barium, manganese or an alkali metal to effect precipitation of the resulting heavy metal sulfides; and separating in a single step the precipitated sulfides together with vein ore contained in the commercial manganese (II) compound or ore.

2. The process as claimed in claim 1, wherein the heavy metal sulfides are precipitated at a pH-value of between 6.5 and 7.5.

3. The process as claimed in claim 1, wherein the sulfide compound used to effect precipitation is used in a slight excess over the quantity theoretically needed.

4. The process as claimed in claim 1, wherein the sulfuric acid solution is an electrolyte solution obtained in the electrolytic production of manganese dioxide.

5. The process as claimed in claim 1, wherein the commercial manganese (II) compound or manganese ore is manganese oxide or manganese carbonate.

6. The process as claimed in claim 1, wherein the precipitation is effected with the use of an alkaline reacting sulfide compound and a low pH-value consistent with the alkalinity of the sulfide compound is established in the solution, prior to the addition of the sulfide compound.

7. The process as claimed in claim 1, wherein, following precipitation of the heavy metal sulfides, the resulting mixture is allowed to stand over a period of between 15 and 120 minutes, and filtered.

8. The process as claimed in claim 1, wherein, following precipitation of the heavy metal sulfides, air is passed through mixture so as to cool it and mix it therewith.

References Cited

UNITED STATES PATENTS

| | | | |
|---|---|---|---|
| 2,343,293 | 3/1944 | Hannay et al. | 423—50 |
| 2,325,723 | 8/1943 | Wanamaker et al. | 423—50 X |
| 2,392,385 | 1/1946 | Hunter | 423—50 X |
| 2,495,456 | 1/1950 | Jacobs | 423—50 X |

HERBERT T. CARTER, Primary Examiner

U.S. Cl. X.R.

423—52